(12) United States Patent
Choi et al.

(10) Patent No.: US 7,931,984 B2
(45) Date of Patent: Apr. 26, 2011

(54) NEGATIVE ELECTRODE FOR RECHARGEABLE LITHIUM BATTERY, AND RECHARGEABLE LITHIUM BATTERY INCLUDING THE SAME

(75) Inventors: Nam-Soon Choi, Suwon-si (KR);
Kyoung-Han Yew, Suwon-si (KR);
Sang-Min Lee, Suwon-si (KR);
Su-Yeong Park, Suwon-si (KR);
Doo-Kyoung Lee, Suwon-si (KR);
Wan-Uk Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 87 days.

(21) Appl. No.: 12/272,700

(22) Filed: Nov. 17, 2008

(65) Prior Publication Data
US 2009/0136845 A1    May 28, 2009

(30) Foreign Application Priority Data

Nov. 28, 2007  (KR) .......................... 10-2007-0122158
Apr. 17, 2008  (KR) .......................... 10-2008-0035758

(51) Int. Cl.
*H01M 4/62* (2006.01)

(52) U.S. Cl. .......... 429/217; 429/212; 524/31; 524/503; 525/56

(58) Field of Classification Search .................. 429/212, 429/213, 217; 525/56, 329.5, 329.7, 330.3; 524/31, 503; 526/255; 516/106
See application file for complete search history.

(56) References Cited

U.S. PATENT DOCUMENTS

| | | | | |
|---|---|---|---|---|
| 5,714,282 A | * | 2/1998 | Tagawa | 429/217 |
| 6,881,517 B1 | * | 4/2005 | Kanzaki et al. | 429/217 |
| 2005/0064291 A1 | * | 3/2005 | Sato et al. | 429/233 |
| 2007/0065720 A1 | | 3/2007 | Hasegawa et al. | |

FOREIGN PATENT DOCUMENTS

| | | |
|---|---|---|
| EP | 0 905 808 A1 | 3/1999 |
| EP | 1 225 647 A2 | 7/2002 |
| JP | 08-321298 | 12/1996 |
| JP | 2000-348730 | 12/2000 |
| KR | 2005-0041661 | 5/2005 |
| KR | 2006-0110235 | 10/2006 |

OTHER PUBLICATIONS

R.A. Young. Chapter 7: Cross-linked cellulose and cellulose derivatives, Absorbent Technol. 2002, 233-281.*
Sigma-Aldrich. Sodium carboxymethyl cellulose product specification, 2010.*

(Continued)

*Primary Examiner* — Jennifer K Michener
*Assistant Examiner* — Carlos Barcena
(74) *Attorney, Agent, or Firm* — Christie, Parker & Hale, LLP

(57) ABSTRACT

A negative electrode for a rechargeable lithium battery and a rechargeable lithium battery including the same are provided. The negative electrode for a rechargeable lithium battery includes a current collector, and a negative active material layer on the current collector. The negative active material layer includes an interpenetrating network network, and a negative active material in the interpenetrating network network. The interpenetrating network is formed by cross-linking a first polymer having a hydroxyl or amine group and a second polymer having a carboxylic acid group. The negative electrode for a rechargeable lithium battery minimizes volume expansion and imparts good cycle-life characteristics and initial formation efficiency.

42 Claims, 5 Drawing Sheets

OTHER PUBLICATIONS

Sigma-Aldrich. Polyacrylic acid product specification, 2010.*
KIPO Office Action dated Jan. 29, 2010 of the Priority Application Korean Patent Application No. 10-2007-0122158, 3 pages.
European Search Report dated May 12, 2009, for corresponding European application 08170146.8, noting listed references in this IDS.
KIPO Office action dated Aug. 31, 2010, for priority Korean Patent application 10-2007-0122158, noting listed reference in this IDS.
SIPO Office action dated Dec. 15, 2010, for corresponding Chinese Patent application 200810180725.8, with English translation, noting U.S. references previously cited in U.S. Office actions dated Apr. 14, 2010 and Aug. 19, 2010.

* cited by examiner

NEGATIVE ELECTRODE FOR RECHARGEABLE LITHIUM BATTERY, AND RECHARGEABLE LITHIUM BATTERY INCLUDING THE SAME

CROSS-REFERENCE TO RELATED APPLICATION

This application claims priority to and the benefit of Korean Patent Application Nos. 10-2007-0122158 and 10-2008-0035758 filed in the Korean Intellectual Property Office on Nov. 28, 2007 and Apr. 17, 2008, respectively, the entire content of each of which is incorporated herein by reference.

BACKGROUND OF THE INVENTION

1. Field of the Invention

The present invention relates to a negative electrode for rechargeable lithium batteries and rechargeable lithium batteries including the same.

2. Description of the Related Art

Lithium rechargeable batteries have recently drawn attention as power sources for small portable electronic devices. Lithium batteries use organic electrolyte solutions, thereby have a discharge voltage that is twice as high as conventional batteries using alkali aqueous solutions. Accordingly, lithium rechargeable batteries have high energy density.

Lithium-transition element composite oxides capable of intercalating lithium, such as $LiCoO_2$, $LiMn_2O_4$, $LiNi_{1-x}Co_xO_2$ (where, $0<x<1$), and so on, have been researched as positive active materials for rechargeable lithium batteries.

Various carbon-based materials that can intercalate and deintercalate lithium ions such as artificial graphite, natural graphite, and hard carbon have been used as negative materials. Graphite increases the discharge voltage and energy density of a battery because it has a low discharge potential compared to lithium (e.g., 0.2V).

Batteries using graphite as a negative active material have a high average discharge potential (e.g., 3.6V). In addition, graphite is more commonly used among the aforementioned carbon-based materials since graphite imparts a better cycle life due to its reversibility characteristic. However, graphite has low density and consequently, low capacity in terms of energy per unit volume when it is used as a negative active material. Further, it can create swelling or capacity reduction when it reacts with an organic electrolyte at a high discharge voltage.

Other materials, such as oxides, or more particularly tin oxide, lithium vanadium-based oxide, and the like have been proposed. However, the use of such oxides for negative electrodes has not shown sufficient improvements in battery performance, and therefore, further research in oxide negative materials continues to develop.

SUMMARY OF THE INVENTION

In one embodiment, the present invention provides a negative electrode for rechargeable lithium batteries having improved initial formation efficiency and cycle-life characteristics.

In another embodiment, the present invention provides a rechargeable lithium battery including the above negative electrode.

According to an embodiment of the present invention, the negative electrode includes a current collector, and a negative active material layer disposed on the current collector. The negative active material layer includes an interpenetrating network and a negative active material in the interpenetrating network.

The interpenetrating network may be formed by cross-linking a first polymer having a hydroxyl or amine group with a second polymer having a carboxylic acid group.

The interpenetrating network may further include a third polymer of a rubber-based or fluorine-based polymer for cross-linking with the first and second polymers.

According to another embodiment of the present invention, a rechargeable lithium battery is provided, which includes the above negative electrode, a positive electrode, and an electrolyte.

When the negative electrode of the present invention is used in a lithium battery, it can improve the cycle-life characteristics of the lithium battery because the negative active material exhibits reduced volume change. In addition, it can improve the formation efficiency because the reactions of an electrolyte with lithium ions therein are reduced or minimized. Lithium batteries with the negative electrode of the present invention can have high capacity because the negative electrode has increased flexibility, thereby preventing breakage of an electrode. Further, the elasticity of the negative electrode can increase the adhesion strength, and can thereby prevent detachment of the active material from the electrode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
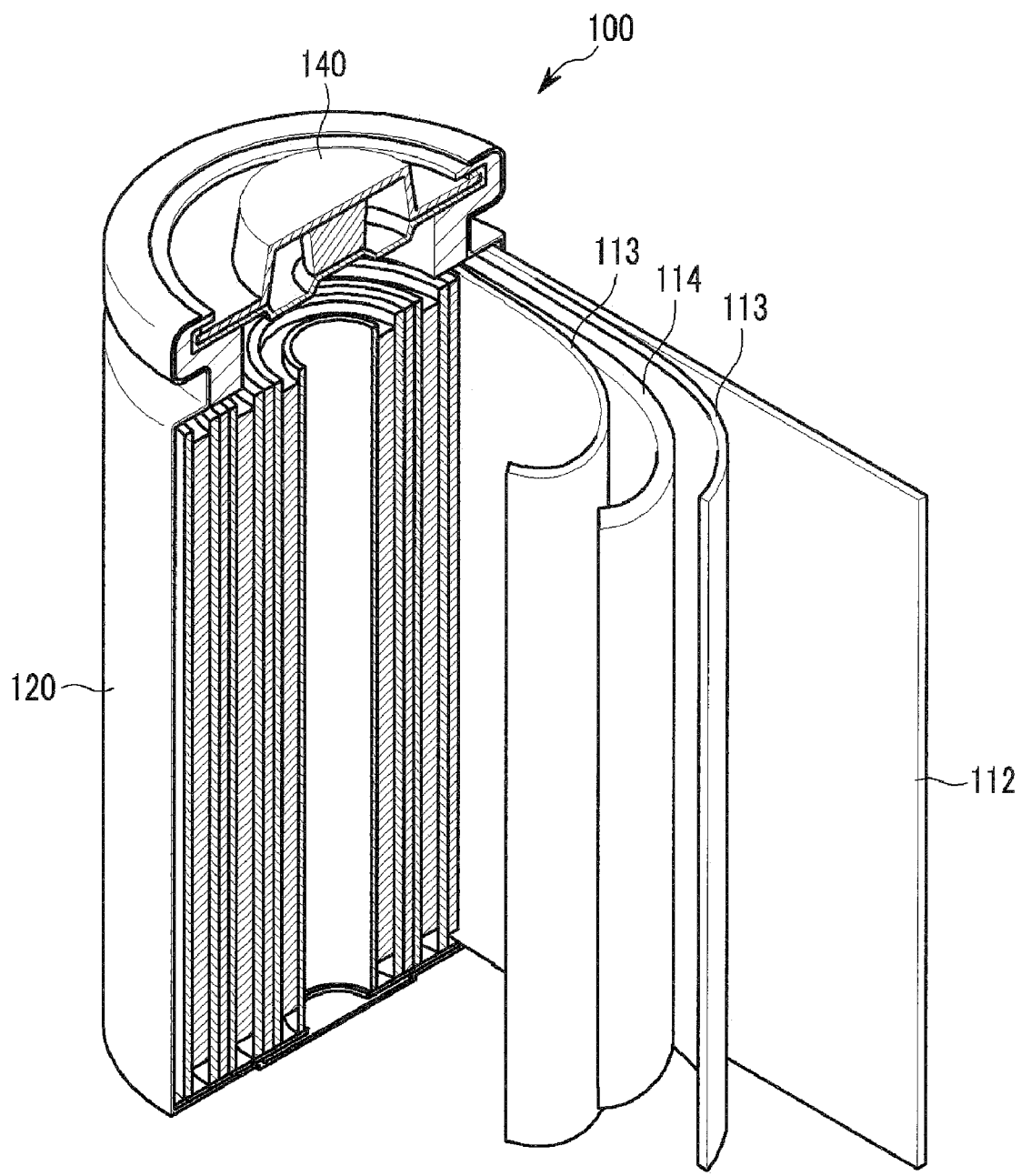
FIG. 1 is a schematic of a rechargeable lithium battery according to one embodiment of the present invention.

In general, negative active materials for rechargeable lithium batteries may include a metal-based active material, such as Si, Sn, and the like. However, the metal-based active material has a large volume change due to its reactions with lithium, and thereby may lose the electrically-conductive network, resulting in degradation of the active material and a decrease in capacity.

Therefore, typical binders such as polyvinylidene fluoride, styrene butadiene rubbers, and the like are not suitable for use with negative active materials having large volume change.

Accordingly, polymer binders such as polyimide-based or polyamide imide-based binders have been suggested as alternatives. While these polymers have good mechanical tensile and adhesion strengths, they electrochemically react with lithium ions, thereby decreasing the formation efficiency of the negative electrode as well as the reversible efficiency at each cycle.

Therefore, the present invention provides a negative electrode including a polymer binder with high toughness and low or no reactivity with lithium ions to suppress or reduce the volume change of the negative active material and thereby improve the cycle-life characteristics. The negative active electrode also has minimal or decreased electrochemical reactions between the electrolyte and lithium ions and has improved initial efficiency.

Then negative electrode according to one embodiment of the present invention includes a current collector, and a negative active material layer disposed on the current collector. The negative active material layer includes an interpenetrating network, and a negative active material in the interpenetrating network.

The interpenetrating network is formed by cross-linking a first polymer having a hydroxyl or amine group and a second polymer having a carboxylic acid group. The interpenetrating network may further include a third polymer of a rubber-based or fluorine-based polymer to cross-link through condensation reactions with the first and the second polymers.

The third polymer can provide flexibility to the negative electrode. When the first, second, and third polymers form an interpenetrating network via condensation reactions, the negative active material has a minimal or reduced volume change. This is possible because of the structural sturdiness or toughness provided by the second polymer therein. The interpenetrating network also has increased adhesion strength to a current collector due to the flexibility and elasticity provided by the third polymer. Accordingly, the interpenetrating network can prevent separation of the active materials from the electrode, as well as breakage, thereby providing a battery with high capacity.

Since the interpenetrating network is not electrochemically reactive with lithium ions, it can electrochemically suppress reactions of the electrolyte with lithium ions, and improve the formation efficiency of the negative electrode.

Further, the interpenetrating network has high strength. In one embodiment, the interpenetrating network has a tensile strength of more than 40 MPa. In another embodiment, it has a tensile strength ranging from 40 to 200 MPa. In yet another embodiment, it has a tensile strength ranging from 50 to 150 MPa. When the tensile strength is within the above ranges, the interpenetrating network can effectively suppress the volume expansion of the negative active material during the charge and discharge cycles. When the tensile strength is less than 40 MPa, the interpenetrating network may not sufficiently suppress the volume expansion of the negative active material.

In addition, the interpenetrating network is solvent-resistant against water and organic solvents. In particular, the interpenetrating network has solvent-resistance less than 5%. The solvent-resistance is measured by dipping the tested electrode into a certain amount of water or organic solvent to measure the amount of the polymer material eluted therefrom. The amount can be determined through quantitative analysis with 1H-NMR or to measure the soluble concentration of the cross-linking polymer binder in a solvent as residue by thermogravimetric analysis (TGA). A lower soluble concentration indicates a better solvent-resistance.

The solvent-resistance of the interpenetrating network can also be examined by submerging the electrode in water or an organic solvent for a set or predetermined amount of time and measuring changes on the electrode surface and adhesion strength. In various embodiments, the electrode has no deteriorated adhesion strength and no detachment of the active material on the surface due to swelling after it is dipped in water or an organic solvent.

In one embodiment, the interpenetrating network is formed by cross-linking reactions of the first and second polymers at a mole ratio between 95:5 and 20:80. In another embodiment, the interpenetrating network may be formed at a mole ratio ranging from 80:20 to 40:60. In converting a mole ratio to a weight ratio, the mole ratio is the same as the weight ratio if both the first and second polymers have the same weight average molecular weight (e.g., 100,000). When the first polymer has a weight average molecular weight of 100,000 and the second polymer has a weight average molecular weight of 20,000, the mole ratio of 95:5 is equivalent to a weight ratio of 90.5:9.5. When the amount of the second polymer is on the high side and is beyond the aforementioned mole ratios, the electrode may have deteriorated flexibility. When the second polymer is included in a small amount, the hydroxyl group (—OH) or amine group (—NH$_2$) of the first polymer may undergo electrochemical decomposition reactions and generate by-product gas, thereby decreasing the battery capacity and efficiency.

When a rubber-based or fluorine-based third polymer is used, the mole ratio of the total number of moles of the first and second polymers to the third polymer may be between 95:5 and 60:40. When the rubber-based or fluorine-based third polymer is excessively included, it may affect the toughness of the interpenetrating network, and thus, the negative electrode. The negative electrode may not be able to endure the volume change of the negative active material and may have an increased resistance, which deteriorates the electrical conductivity characteristic. When the third polymer is included in an amount smaller than the above range, the negative electrode may have a decrease in flexibility and adhesion strength, thereby causing the substrate to break easily.

Suitable examples for the first polymers are polymers having a hydroxyl or amine group and at least one repeating unit represented by the following Formulas 1 to 3.

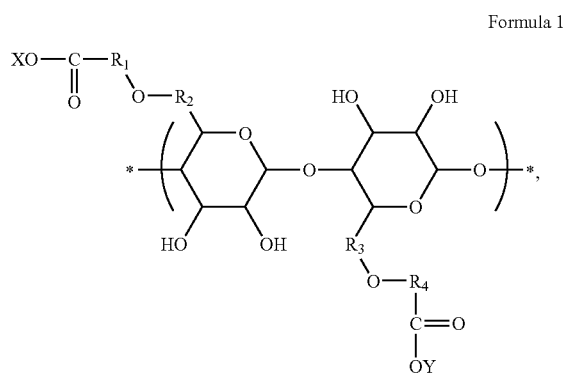

Formula 1 where each of $R_1$ and $R_4$ is independently selected from the group consisting of C1 to C4 alkylenes, and alkylene oxides.

In one embodiment, each of $R_1$ and $R_4$ is selected from the group consisting of —$CH_2CH_2O$—, —$CH_2CH(CH_3)O$—), and —$CH_2O$—, each of $R_2$ and $R_3$ is independently —$(CRR')_n$—, where each of R and R' is independently hydrogen or a C1 to C5 alkyl, and n is an integer ranging from 1 to 4, or more specifically, from 1 to 2. In one embodiment, each $R_2$ and $R_3$ is hydrogen or a methyl, and X and Y are independently selected from alkali metals. In one embodiment, X and Y are either Na or K, or both.

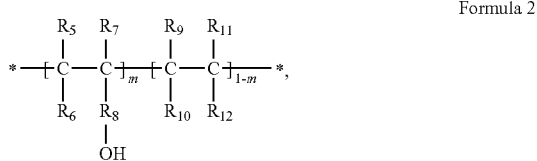

Formula 2 where each of $R_5$ to $R_7$ and $R_{10}$ is independently selected from the group consisting of hydrogen, and C1 to C5 alkyls. In one embodiment, each of $R_5$ to $R_7$ is hydrogen or a methyl, $R_8$ is $(CRR')_n$— (in one embodiment, $R_8$ is —$CH_2$—), where each of R and R' is independently selected from the group consisting of hydrogen and C1 to C5 alkyls (in one embodiment, each of R and R' is independently hydrogen or methyl), and n is an integer ranging from 0 to 4, or more specifically, from 1 to 2, each of $R_9$ and $R_{11}$ is independently selected from the group consisting of hydrogen, C1 to C5 alkyls, and —$(CRR')_n OR''$, where R, R', and R'' are independently hydrogen, or C1 to C5 alkyls, and n is an integer ranging from 1 to 4, $R_{12}$ is —OCOZ, where Z can be an alkali metal. In one embodiment, Z is Na or K, and m ranges from 0.1 to 1.

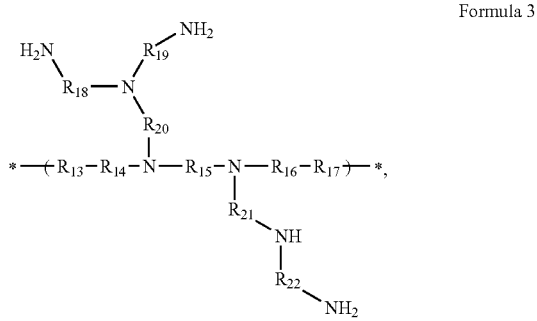

Formula 3 where each of $R_{13}$, $R_{15}$, and $R_{17}$ to $R_{22}$ is independently be —$(CRR')_n$—, where each of R and R' can independently be a hydrogen or a C1 to C5 alkyl, and n is an integer ranging from 1 to 4, and each of $R_{14}$ and $R_{16}$ can independently be —$[(CRR')_p$—$(NH)]_q$—, where each of R and R' can independently be a hydrogen or a C1 to C5 alkyl, p is an integer ranging from 1 to 4, and q is an integer ranging from 1 to 2.

Nonlimiting examples of suitable first polymers include carboxylmethyl cellulose, polyvinyl alcohol, copolymers of vinyl alcohol and vinyl acetate, copolymers of vinyl alcohol and styrene, copolymers of vinyl alcohol and methyl methacrylate, copolymers of vinyl alcohol and methylacrylate, copolymers of vinyl alcohol and ethyl methacrylate, copolymers of vinyl alcohol and ethylacrylate, copolymers of vinyl alcohol and butylacrylate, copolymers of vinyl alcohol and butyl methacrylate, polyethyleneimine, and mixtures thereof.

The first polymer may have a weight average molecular weight (Mw) ranging from 1000 to 1,000,000. In another embodiment, it may have a weight average molecular weight (Mw) ranging from 50,000 to 200,000. When it has a weight average molecular weight less than 1000, the viscosity of the slurry for forming an electrode may deteriorate. When it has a weight average molecular weight more than 1,000,000, the solvability of the solvent may deteriorate.

The second polymer may be a polymer having a carboxylic acid group capable of cross-linking with the hydroxyl or amine group of the first polymer. The second polymer may be a compound including a repeating unit of the following Formula 4.

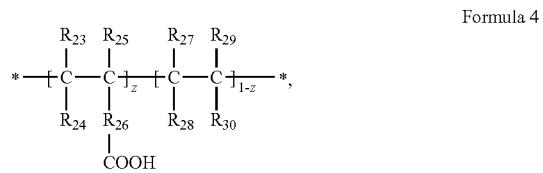

Formula 4 where each of $R_{23}$ to $R_{25}$ and $R_{28}$ can independently be hydrogen, or a C1 to C5 alkyl. In one embodiment, each of $R_{23}$ to $R_{25}$ and $R_{28}$ is independently hydrogen, or a methyl, $R_{26}$ is or —$(CRR')_n$— (in one embodiment, $R_{26}$ is —$CH_2$—), where each of R and R' can independently be a hydrogen or a C1 to 5 alkyl, and n is an integer ranging from 0 to 4, each of $R_{27}$ and $R_{29}$ can independently be selected from the group consisting of hydrogen, C1 to C5 alkyls, and —$(CRR')_n OR''$, where each of R, R', and R'' can independently be a hydrogen, or a C1 to C5 alkyl, and n is an integer ranging from 1 to 4, $R_{30}$ is —OCOZ, where, Z is an alkali metal, and $0 < z \leq 1$. In one embodiment, z ranges from 0.1 to 1.

Nonlimiting examples of suitable second polymers include poly(meth)acrylic acid, copolymers of (meth)acrylic acid and (meth)ethylacrylic acid, copolymers of (meth)acrylic acid and (meth)butylacrylic acid, and mixtures thereof. As used herein, the term "poly(meth)acrylic acid" refers to polyacrylic acid or polymethacrylic acid.

The second polymer may have a weight average molecular weight (Mw) ranging from 1000 to 1,000,000. In one embodiment, it has a weight average molecular weight ranging from 50,000 to 200,000. When the weight average molecular weight is less than 1000, the slurry for forming an electrode may have low viscosity, so it is difficult to form an electrode. When the weight average molecular weight is more than 1,000,000, the slurry may have deteriorated solvability in a solvent and may not have sufficient cross-linking in an electrode.

In one embodiment, the first and second polymers are water-soluble and can be dissolved in water rather than an organic solvent when it is formed into a negative active material layer.

Nonlimiting examples of suitable rubber-based third polymers include styrene butadiene rubbers (SBR), nitrile butadiene rubbers (NBR), methyl methacrylate butadiene rubbers, chloroprene rubbers, carboxyl modified styrene butadiene rubbers, modified polyorganosiloxane-based polymers and combinations thereof. In one embodiment, styrene butadiene rubbers may be appropriate.

Nonlimiting examples of suitable fluorine-based third polymers include polyvinylidene fluoride (PVdF), copolymers of vinylidene chloride and hexafluoropropylene, and so on. In one embodiment, polyvinylidene fluoride may be appropriate.

In various embodiments, the negative active material is dispersed in the interpenetrating network.

Nonlimiting examples of suitable negative active materials include lithium metals, metal materials that can alloy with lithium, transition elements oxide, materials that are capable of reversibly doping and dedoping with lithium, materials that are capable of forming lithium-containing compounds, materials that are reversibly capable of intercalating and deintercalating lithium ions, and so on.

Nonlimiting examples of suitable metal materials that can alloy with lithium include Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof. Nonlimiting examples of suitable transition elements oxide, materials that are reversibly capable of doping and dedoping with lithium, or materials that are reversibly capable of forming lithium-containing compounds, include vanadium oxide, lithium vanadium oxide, Si, $SiO_x$ (where, $0<x<2$), Si—Y alloys (where, Y is an element selected from the group consisting of alkali metals, alkaline-earth metals, group 13 elements, group 14 elements, transition elements, rare earth elements, and combinations thereof, except for Si), Sn, $SnO_2$, Sn—Y (where, Y is an element selected from the group consisting of alkali metals, alkaline-earth metals, group 13 elements, group 14 elements, transition elements, rare earth elements, and combinations thereof, except for Sn), titanium nitrate, and so on. At least one of the above negative active materials may be combined with $SiO_2$. In one embodiment, the element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, In, Ti, Ge, Sn, P, As, Sb, Bi, S, Se, Te, Po, and combinations thereof.

Nonlimiting examples of suitable materials that are reversibly capable of intercalating and deintercalating lithium ions include any generally-used carbon-based negative active materials in lithium ion rechargeable batteries such as crystalline carbons, amorphous carbons, or mixtures thereof. Nonlimiting examples of suitable crystalline carbons include amorphous, plate-shape, flake, spherical shape, or fiber-shape natural graphite, or artificial graphite. Suitable examples of amorphous carbons include soft carbon (low temperature fired carbon) or hard carbons, mesophase pitch carbides, fired cokes, and so on.

In one embodiment, the negative active material is selected from the group consisting of Si, $SiO_x$ (where, $0<x<2$), Sn, $SnO_2$, and mixtures thereof.

The negative active material may be included in an amount ranging from 80 to 99 wt % based on the total weight of the negative active material layer. In one embodiment, the negative active material is included in an amount between 90 and 96 wt % based on the total weight of the negative active material layer. When the amount of the negative active material is less than 80 wt %, a high-capacity negative electrode may not be achieved. When it is more than 96 wt %, the amount of a binder in the negative electrode may not be sufficient to provide adequate adhesion strength between the negative active and the current collector.

The above negative active material layer having a negative active material dispersed in an intervening cross-linking network may further include an additional component selected from the group consisting of conductive agents, cross-linking agents, and mixtures thereof.

Any electrically conductive material can be used as a conductive agent unless it causes a chemical change. Nonlimiting examples of suitable conductive agents include natural graphite, artificial graphite, carbon black, acetylene black, ketjen black, carbon fibers, polyphenylene derivatives, metal powders, or metal fibers including copper, nickel, aluminum, silver, and so on.

Other conductive agents known in the art can also be used, and the amount can be controlled according to the purpose of use.

The first and second polymers, and optionally the third polymer can be crosslinked by thermal condensation reactions, but other reaction schemes can also be employed, such as utilizing cross-linking agents to promote crosslinking reactions.

When a negative active material layer has the aforementioned composition, it can have excellent adhesion strength to a current collector. The adhesion strength to a current collector can be in a range between 0.05 N/mm and 0.2 N/mm. In another embodiment, it is in a range between 0.1 N/mm and 0.2 N/mm.

In one embodiment, the negative active material layer is formed on a current collector.

The current collector may be selected from the group consisting of copper foils, nickel foils, stainless steel foils, titanium foils, nickel foam, copper foam, polymer materials coated with a conductive metal, and combinations thereof.

When the negative active material layer and the current collector are made into a negative electrode, the negative electrode has a low thickness expansion rate after being exposed to and permeated with an electrolyte solution during the battery charge and discharge cycles. The change in thickness of the negative electrode can be calculated according to the following Equation 1. A negative electrode may have an increase or change in thickness less than 40% after being exposed to or permeated with an electrolyte solution. In another embodiment, it may have an increase or change in thickness between 1 and 10%, or specifically, between 1 and 5%.

Change in thickness or expansion ratio of a negative electrode (%)=[(thickness of a negative electrode after being exposed to and permeated with an electrolyte solution−thickness of the negative electrode before permeation)/thickness of the negative electrode before permeation]×100     Equation 1

The negative electrode can be prepared by preparing a composition for forming an active material layer, which includes a first and a second polymer and a negative active material, and forming an active material layer by coating the composition on a current collector, heat treating the coated current collector, and then vacuum heat treating it.

The manufacturing method will be illustrated in further detail below. First, the first and second polymers and a negative active material are dispersed or dissolved in a solvent, and a composition for forming an active material layer is then prepared. A third polymer may be additionally included.

The type and amount of the first, the second, and optionally the third polymers, and the negative active material can be same as previously discussed.

The first and second polymers and optionally the third polymer may be provided in solid or solution forms. When provided as a solution, the first, second, and third polymers are dissolved in a solvent since they are water-soluble.

The composition for forming an active material layer can be dissolved in a water-soluble solvent such as water. The amount of the solvent can be determined and adjusted so that certain viscosity, and coating and printability characteristics of the active material layer can be achieved.

The composition for forming an active material layer may include an additive selected from the group consisting of conductive agents for improving conductivity, cross-linking agents for facilitating cross-linking, and mixtures thereof.

The composition for forming an active material layer is coated on a current collector, heated, and vacuum heat treated to form a negative active material layer.

Nonlimiting examples of suitable methods of applying the composition include screen printing, spray coating, doctor blade coating, gravure coating, dip-coating, silk screening, painting, and slot die method, based on the viscosity of the composition.

The current collector is the same as aforementioned.

In one embodiment, the composition for forming an active material layer is coated on a current collector and heat-treated at a temperature ranging from 80 to 120° C. In another embodiment, it may be heat-treated at a temperature ranging from 90 to 110° C. to evaporate the solvent in the composition for forming an active material layer. When it is heat-treated at a temperature lower than 80° C., the solvent may not be completely evaporated. When it is heat-treated at a temperature higher than 120° C., the solvent may rapidly volatilize, thereby deteriorate the gas generation and surface uniformity of the electrode. In certain embodiment, the solvent evaporation or drying can be done under atmospheric conditions.

After a solvent in a composition for forming an active material layer coated on a current collector has been evaporated through heat treatment, a second heat treatment may be performed under vacuum.

In one embodiment, the second heat treatment is performed under vacuum at a temperature ranging from 130 to 200° C. In another embodiment, it may performed at a temperature ranging from 150 to 200° C. to induce condensation reactions of the first, second, and optionally third polymers in the composition. The first, second, and optionally third polymers condensation reactions occur during the second heat treatment to form cross-link and generate water. The generated water is evaporated by the heat treatment. When the second heat treatment is performed at a temperature lower than 130° C., condensation reactions may not sufficiently occur. When it is performed at a temperature higher than 200° C., the binder in the electrode may decompose.

The second heat treatment may be performed under vacuum. The vacuum pressure may be less than $1 \times 10^{-4}$ torr. When the vacuum pressure is higher than $1 \times 10^{-4}$ torr, the coating layer may not adhere properly to the current collector. In one embodiment, the vacuum pressure ranges from $1 \times 10^{-4}$ to $1 \times 10^{-6}$ torr. In another embodiment, the vacuum pressure ranges from $5 \times 10^{-5}$ to $1 \times 10^{-6}$ torr.

Based on the aforementioned manufacturing method, a negative active material layer formed on a current collector is provided, which includes an intervening network formed by cross-linking the first, second, and optionally, third polymers, and a negative active material distributed in the network.

When the negative electrode is used in a rechargeable lithium battery, the cross-linking networks in the active material layer can suppress or prevent volume change, thereby improving the battery cycle-life characteristics. In addition, the negative electrode of the present invention can electrochemically suppress reactions of the electrolyte with lithium ions, thereby improving the formation efficiency of the negative electrode. In addition, when the third polymer is further included, it can enhance the flexibility and elasticity of the cross-linking network, thereby increasing the adhesion strength. Further, when the active material layer is formed with a sufficient thickness, the electrode may not break, and hence provide batteries with high capacity.

According to another embodiment of the present invention, a rechargeable lithium battery including the negative electrode is provided.

Rechargeable lithium batteries may be categorized into lithium ion batteries, lithium ion polymer batteries, and lithium polymer batteries based on the types of separators and electrolytes used in the battery. The rechargeable lithium batteries may be provided in different shapes and sizes, such as cylindrical, prismatic, or coin-type batteries, and may be thin film or bulky types of batteries. Structures and manufacturing methods for lithium ion batteries pertaining to the present invention are well known in the art; hence they will not be discussed in detail.

FIG. 1 is an exploded perspective view of a rechargeable lithium battery according to one embodiment of the present invention. FIG. 1 shows a structure of a cylindrical battery according to one embodiment of the present invention, but the battery of the present invention is not limited to the structure of FIG. 1. The battery according to one embodiment of the present invention may be a prismatic or pouch-type battery.

FIG. 1 illustrates a cylindrical rechargeable lithium battery 100, which includes a negative electrode 112, a positive electrode 114, a separator 113 interposed between the negative electrode 112 and the positive electrode 114, an electrolyte impregnating the separator 113, a battery case 120, and a sealing member 140 sealing the battery case 120. The rechargeable lithium battery 100 is formed by stacking the negative electrode 112, positive electrode 114, and separator 113, spirally-winding them, and then injecting them in the battery case 120.

The negative electrode 112 can be prepared according to the same method as previously described.

The positive electrode 114 includes a current collector, and a positive active material layer disposed on the current collector.

The positive active material layer may include a positive active material, for example, a lithiated intercalation compound that is capable of reversibly intercalating and deintercalating lithium ions. Specifically, the positive active material includes compounds of the following Formulas 5 to 29.

   Formula 5 where, $0.95 \leq a \leq 1.1$ and $0 \leq b \leq 0.5$.

   Formula 6 where, $0.95 \leq a \leq 1.1$, $0 \leq b \leq 0.5$, and $0 \leq c \leq 0.05$.

   Formula 7 where, $0 \leq b \leq 0.5$ and $0 \leq c \leq 0.05$.

   Formula 8 where, $0.95 \leq a \leq 1.1$, $0 \leq b \leq 0.5$, $0 \leq c \leq 0.05$, and $0 < \alpha \leq 2$.

   Formula 9 where, $0.95 \leq a \leq 1.1$, $0 \leq b \leq 0.5$, $0 \leq c \leq 0.05$, and $0 < \alpha < 2$.

   Formula 10 where, $0.95 \leq a \leq 1.1$, $0 \leq b \leq 0.5$, $0 \leq c \leq 0.05$, and $0 < \alpha < 2$.

   Formula 11 where, $0.95 \leq a \leq 1.1$, $0 \leq b \leq 0.5$, $0 \leq c \leq 0.05$, and $0 < \alpha \leq 2$.

   Formula 12 where, $0.95 \leq a \leq 1.1$, $0 \leq b \leq 0.5$, $0 \leq c \leq 0.05$, and $0 < \alpha < 2$.

   Formula 13 where, $0.95 \leq a \leq 1.1$, $0 \leq b \leq 0.5$, $0 \leq c \leq 0.05$, and $0 < \alpha < 2$.

$$Li_aNi_bE_cG_dO_2, \qquad \text{Formula 14}$$

where, $0.90 \leq a \leq 1.1$, $0 \leq b \leq 0.9$, $0 \leq c \leq 0.9$, and $0.001 \leq d \leq 0.1$.

$$Li_aNi_bCo_cMn_dG_eO_2, \qquad \text{Formula 15}$$

where, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2, \qquad \text{Formula 16}$$

where, $0.90 \leq a \leq 1.1$ and $0.001 \leq b \leq 0.1$.

$$Li_aCoG_bO_2, \qquad \text{Formula 17}$$

where, $0.90 \leq a \leq 1.1$ and $0.001 \leq b \leq 0.1$.

$$Li_aMnG_bO_2, \qquad \text{Formula 18}$$

where, $0.90 \leq a \leq 1.1$ and $0.001 \leq b \leq 0.1$.

$$Li_aMn_2G_bO_4, \qquad \text{Formula 19}$$

where, $0.90 \leq a \leq 1.1$ and $0.001 \leq b \leq 0.1$.

$$QO_2 \qquad \text{Formula 20}$$

$$QS_2 \qquad \text{Formula 21}$$

$$LiQS_2 \qquad \text{Formula 22}$$

$$V_2O_5 \qquad \text{Formula 23}$$

$$LiV_2O_5 \qquad \text{Formula 24}$$

$$LiZO_2 \qquad \text{Formula 25}$$

$$LiNiVO_4 \qquad \text{Formula 26}$$

$$Li_{(3-f)}J_2(PO_4)_3 \text{ (where, } 0 \leq f \leq 3) \qquad \text{Formula 27}$$

$$Li_{(3-f)}Fe_2(PO_4)_3 \text{ (where, } 0 \leq f \leq 2) \qquad \text{Formula 28}$$

$$LiFePO_4 \qquad \text{Formula 29}$$

In the above Formulas 5 to 29, A is selected from the group consisting of Ni, Co, Mn, and combinations thereof; X is selected from the group consisting of Al, Ni, Co, Mn, Cr, Fe, Mg, Sr, V, rare earth elements, and combinations thereof; D is selected from the group consisting of O, F, S, P, and combinations thereof; E is selected from the group consisting of Co, Mn, and combinations thereof; M is selected from the group consisting of F, S, P, and combinations thereof; G is selected from the group consisting of Al, Cr, Mn, Fe, Mg, Sr, V, lanthanide elements such as La, Ce, and combinations thereof; Q is selected from the group consisting of Ti, Mo, Mn, and combinations thereof; Z is selected from the group consisting of Cr, V, Fe, Sc, Y, and combinations thereof; and J is selected from the group consisting of V, Cr, Mn, Co, Ni, Cu, and combinations thereof.

In addition, the positive active material may include inorganic sulfur ($S_8$, elemental sulfur) and a sulfur-based compound. The sulfur-based compound may include $Li_2S_n$ (where, $n \geq 1$), $Li_2S_n$ (where, $n \geq 1$) dissolved in a catholyte, an organic sulfur compound, a carbon-sulfur polymer (e.g., $(C_2S_f)_n$, where $2.5 \leq f \leq 50$, and $n \geq 2$), and the like.

The positive active material may include a positive active material with a coating layer, or a compound of the active material and the active material being coated with a coating layer.

Nonlimiting examples of suitable coating layers include oxides and hydroxides of the coating element, oxyhydroxides of the coating element, oxycarbonates of the coating element, and hydroxylcarbonates of the coating element. The compound for the coating layer may be either amorphous or crystalline. Nonlimiting examples of suitable coating elements include Mg, Al, Co, K, Na, Ca, Si, Ti, V, Sn, Ge, Ga, B, As, Zr, and combinations thereof.

The coating process can be any conventional process so long as long as it does not causes any side effects on the properties of the positive active material (e.g., spray coating, immersing), which is well known to persons having ordinary skill in this art, so a detailed description will be omitted.

The positive active material layer may further include a binder and a conductive agent.

The binder improves the binding properties of the positive active material particles to each other and to a current collector. Nonlimiting examples of suitable binders include polyvinyl alcohol, carboxylmethyl cellulose, hydroxylpropyl cellulose, diacetyl cellulose, polyvinylchloride, carboxylated polyvinyl chloride, polyvinyl fluoride, ethylene oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylons, and so on.

The conductive agent improves electrical conductivity of a negative electrode. Any electrically conductive material can be used as a conductive agent so long as it does not cause a chemical change. Nonlimiting examples of suitable conductive agents include natural graphites, artificial graphites, carbon black, acetylene black, ketjen black, polyphenylene derivatives, carbon fibers, metal powders or metal fibers including copper, nickel, aluminum, silver, and so on.

One nonlimiting example of a suitable current collector is Al.

The positive electrode 114 may be prepared as follows: a composition for a positive active material layer is prepared by mixing the positive active material, a binder, and a conductive agent. The composition for a positive active material layer is then coated on a current collector. The method of manufacturing an electrode is well known in this art, so a detailed description will be omitted. The solvent may include N-methylpyrrolidone, but it is not limited thereto.

In one embodiment, the electrolyte includes a non-aqueous organic solvent and a lithium salt.

The non-aqueous organic solvent acts as a medium for transmitting ions taking part in electrochemical reactions of the battery.

Nonlimiting examples of suitable non-aqueous organic solvents include carbonate-based, ester-based, ether-based, ketone-based, alcohol-based, and aprotic solvents. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Nonlimiting examples of suitable ester-based solvents may include methyl acetate, ethyl acetate, n-propyl acetate, dimethylacetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone and so on. Nonlimiting examples of suitable aprotic solvents include nitriles such as Z—CN (where, Z is a C2 to C20 linear, branched, or cyclic hydrocarbon, a double-bond aromatic ring, or an ether bond), amides such as dimethylformamide, and dioxolane such as 1,3-dioxolane, sulfolane, and so on.

The non-aqueous organic solvent may be used singularly or as a mixture. When the organic solvent is used as a mixture, the mixture ratio can be controlled or adjusted according to the desired battery performance.

The carbonate-based solvent may include a mixture of cyclic carbonate and linear carbonate. In one embodiment, the cyclic carbonate and the linear carbonate are mixed together in a volume ratio ranging from 1:1 to 1:9. When the mixture is used as an electrolyte, the electrolyte performance may be enhanced.

Further, the non-aqueous organic solvent may include a mixture of carbonate-based solvents and aromatic hydrocarbon-based solvents. In one embodiment, the carbonate-based solvents and the aromatic hydrocarbon-based solvents are mixed together in a volume ratio between 1:1 and 30:1.

The aromatic hydrocarbon-based organic solvent may be represented by the following Formula 30:

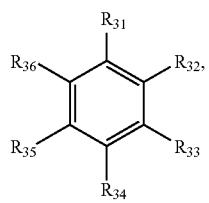

Formula 30 where each of $R_{31}$ to $R_{36}$ is independently selected from the group consisting of hydrogen, halogen, C1 to C10 alkyls, C1 to C10 haloalkyls, and combinations thereof.

Nonlimiting examples of suitable aromatic hydrocarbon-based organic solvents include, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or ethylene carbonate-based compounds of the following Formula 31 in order to improve the battery cycle-life characteristics.

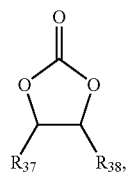

Formula 31 where each of $R_{37}$ and $R_{38}$ is independently selected from the group consisting of hydrogen, halogens, cyano (CN) groups, nitro ($NO_2$) groups, and fluorinated C1 to C5 alkyls, provided that both $R_{37}$ and $R_{38}$ cannot be hydrogen.

Nonlimiting examples of suitable ethylene carbonate-based compounds include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and so on. The amount of the above solvent additives can be adjusted to obtain cycle-life improvement.

The lithium salt supplies lithium ions in the battery, and facilitates a basic operation of the rechargeable lithium battery and improves lithium ion transport between the positive and negative electrodes. Nonlimiting examples of suitable lithium salts include $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where, p and q are natural numbers), LiCl, LiI, lithium bis(oxalate) borate, and mixtures thereof.

The lithium salt may be used at a 0.1 to 2.0M concentration. When the lithium salt concentration is less than 0.1M, electrolyte performance may deteriorate due to low electrolyte conductivity. When it is more than 2.0M, the lithium ion mobility may reduce due to an increase in electrolyte viscosity.

The rechargeable lithium battery may further include a separator 113 between a negative electrode 112 and a positive electrode 114. Nonlimiting examples of suitable separator 113 materials include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

The following examples illustrate the present invention in more detail. These examples, however, should not be interpreted as limiting the scope of the present invention.

EXAMPLE 1

Fabrication of a Negative Electrode

A silicon oxide negative active material (SHR12, Shin-Etsu Chemical Co., Ltd.) was mixed with carboxylmethylcellulose having a weight average molecular weight (Mw) of 90,000 dissolved in water, and polyacrylic acid with a Mw of 100,000 dissolved in water to provide a composition for forming an active material layer. The carboxylmethylcellulose and polyacrylic acid were provided in a mole ratio of 73.5:26.5 on a dry basis, the mixture included 93 wt % of the silicon oxide negative active material, 5 wt % of carboxylmethylcellulose, and 2 wt % of polyacrylic acid.

The composition for forming an active material layer was screen-printed on a Cu current collector and then heat-treated at 90° C. Then, it was heat-treated again at 200° C. under a vacuum pressure of $1 \times 10^{-6}$ Torr to provide a negative electrode.

EXAMPLE 2

Fabrication of a Negative Electrode 93 wt % of a silicon oxide negative active material (SHR12, Shin-Etsu Chemical Co., Ltd.), 4 wt % of carboxylmethylcellulose, 2 wt % of polyacrylic acid, and 1 wt % of super-P as a conductive agent were mixed in water to provide a composition (having a 69:31 mole ratio mixture of carboxylmethyl cellulose and polyacrylic acid) for forming an active material layer.

The composition for forming an active material layer was screen-printed on a Cu current collector and heat-treated at 90° C. Then, it was heat-treated again at 200° C. under a vacuum pressure of 1×10⁻⁶ Torr to provide a negative electrode.

COMPARATIVE EXAMPLE 1

Fabrication of a Negative Electrode 93 wt % of a silicon oxide negative active material (SHR12, Shin-Etsu Chemical Co., Ltd.) and 7 wt % of polyamide imide having a Mw of 400,000 were mixed in N-methyl pyrrolidone as a solvent, to prepare a composition for forming an active material layer. The composition for forming an active material layer was screen-printed on a Cu current collector and dried at 120° C., to provide a negative electrode.

COMPARATIVE EXAMPLE 2

Fabrication of a Negative Electrode

A negative electrode was prepared according to the same method as Comparative Example 1 except for using polyvinylidene fluoride having a Mw of 600,000 instead of polyamide imide as a binder.

COMPARATIVE EXAMPLE 3

Fabrication of a Negative Electrode

A negative electrode was prepared according to the same method as Comparative Example 1 except for using 5 wt % of carboxylmethyl cellulose and 2 wt % of polyacrylic acid as an amorphous polymer instead of polyamide imide as a rigid polymer.

COMPARATIVE EXAMPLE 4

Fabrication of a Negative Electrode

A negative electrode was prepared according to the same method as Comparative Example 1 except for using 7 wt % of carboxylmethyl cellulose instead of polyamide imide as a binder.

Fabrication of a Cell for Testing Battery Cell Characteristics

A test cell was prepared in the following method to evaluate electrochemical characteristics of the negative electrodes of Examples 1 and 2 and Comparative Examples 1 to 4.

The negative electrodes of Example 1 and Comparative Example 1 were included in the test cells.

A composition for a positive active material was prepared by mixing $LiCoO_2$ with an average particle diameter of 10 μm, polyvinylidene fluoride as a binder, and carbon (Super-P) as a conductive material in a weight ratio of 94:3:3 and dispersing the mixture in N-methyl-2-pyrrolidone. The composition was coated on an aluminum foil 15 μm thick and compressed, to provide a positive electrode.

The electrodes were wound and compressed together with a 25 μm-thick polyethylene separator, and an electrolyte solution was injected therein, to provide an 18650 cylindrical battery cell. The electrolyte solution was prepared by dissolving 1 mol/L of $LiPF_6$ in a mixed solvent prepared by mixing propylene carbonate (PC), diethyl carbonate (DEC), ethylene carbonate (EC) mixed in a volume ratio of 1:1:1.

Battery Cell Characteristic Evaluation

1. Charge and Discharge Capacity and Formation Efficiency

The test cells including the negative electrodes of Examples 1 and 2 and Comparative Examples 1 to 4 were respectively evaluated for charge and discharge capacity and formation efficiency during the formation charge and discharge. The results are shown in the following Table 1 and FIG. 2.

The formation charge was performed by charging the cells with 4.4V at 0.2 C and discharging up to 2.75V with 0.2 C.

TABLE 1

|  | Charge capacity (mAh) | Discharge capacity (mAh) | Formation efficiency (%) |
|---|---|---|---|
| Example 1 | 9.91 | 7.21 | 73.9 |
| Comparative Example 1 | 9.87 | 6.83 | 69.2 |

Figure 2:
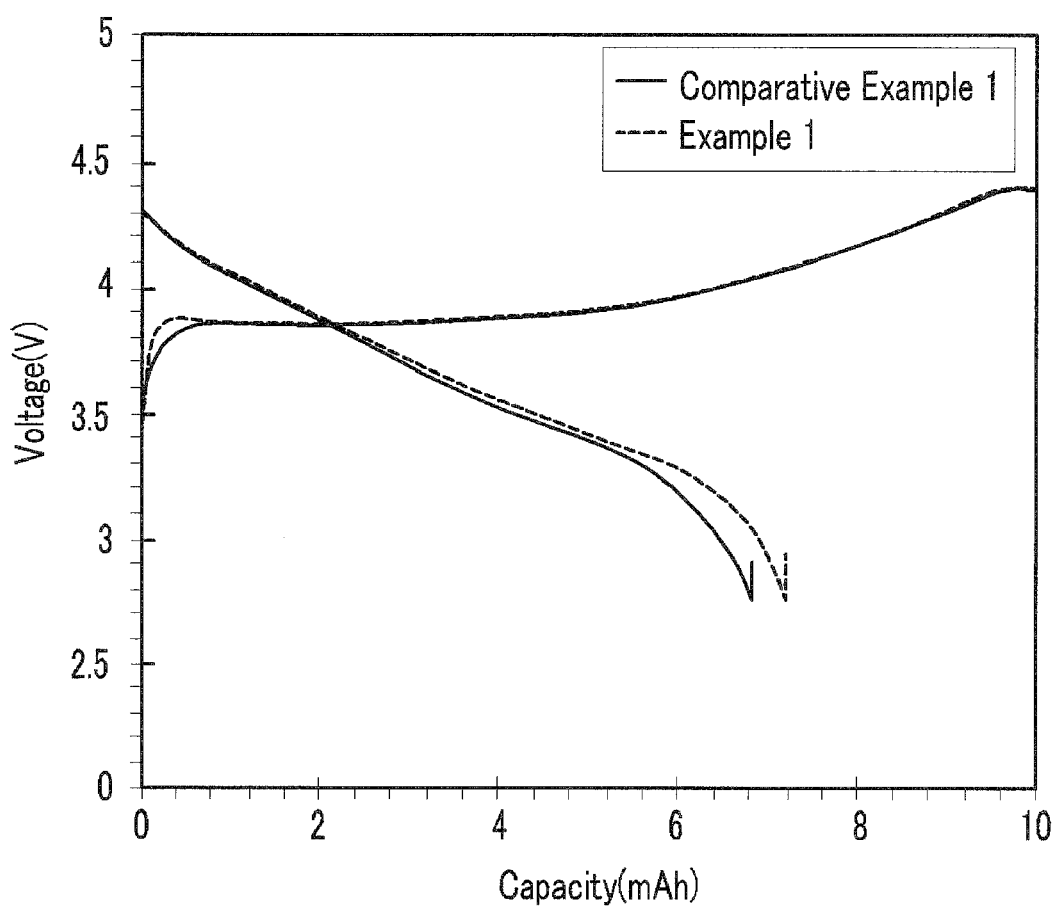
FIG. 2 is a graph showing the initial charge and discharge capacities of the cells including the negative electrodes according to Example 1 of the present invention and Comparative Example 1.

FIG. 2 is a graph showing the initial charge and discharge capacities during the formation charge of the negative electrodes according to Example 1 and Comparative Example 1.

As shown in Table 1 and FIG. 2, the negative electrode including an interpenetrating network of the binder resin of Example 1 had better results in terms of the initial charge and discharge capacities and formation efficiency than the one of Comparative Example 1.

2. Initial Electrode Expansion Ratio Evaluation

The negative electrodes of Example 1 and Comparative Example 1 were evaluated for electrode expansion ratio after the formation charge. The electrode expansion ratio was calculated as a percent ratio of the electrode volume change before and after the formation charge.

The negative electrode of Example 1 had an electrode expansion ratio of 30%, while the one of Comparative Example 1 had an electrode expansion ratio of 50%. The reason is that expansion of the electrode in the negative electrode of Example 1 was suppressed by the interpenetrating network included in the active material.

3. Cycle-Life Characteristic Evaluation

The test cells including the negative electrode of Example 1 and Comparative Example 1 were evaluated for cycle-life characteristics. The cycle-life characteristic evaluation was performed under a current condition between 0.8 C and 1 C, and between 4.3V to 2.75 V (one-time charge and discharge). The cycle-life characteristic was evaluated by measuring the discharge capacity retention. The discharge capacity retention was measured as a percent ratio of capacity after charge and discharge against the initial capacity. The results are shown in FIG. 3.

Figure 3:
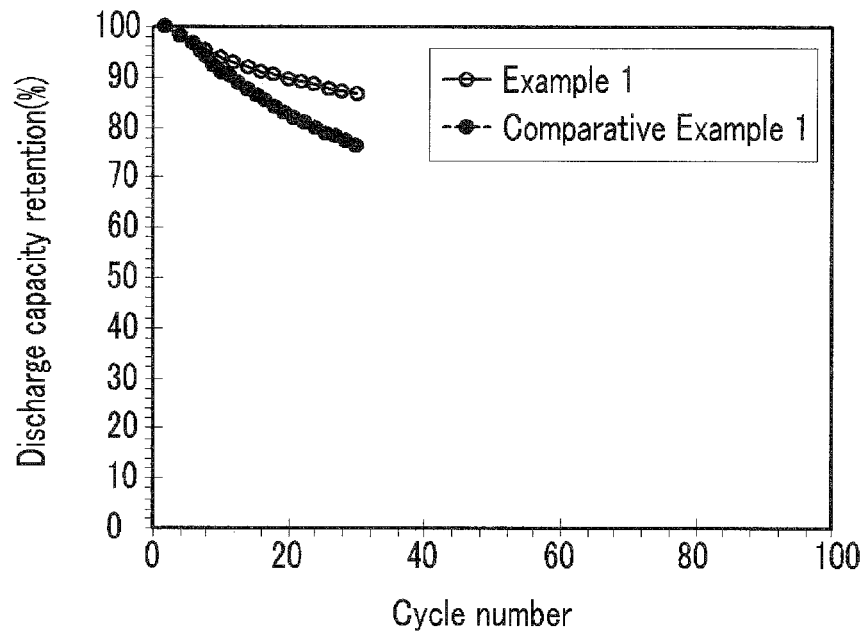
FIG. 3 is a graph showing the discharge capacity retention of the cells including the negative electrodes according to Example 1 of the present invention and Comparative Example 1.

As shown in FIG. 3, the negative electrode of Example 1 had better discharge capacity retention than the one of Comparative Example 1. In addition, it had about 20% increased discharge capacity compared with the one of Comparative Example 1 as the number of cycles increased. Therefore, the negative electrode of Example 1 has better cycle-life characteristics than the one of Comparative Example 1.

4. Discharge Capacity Retention Evaluation

The test cells including the negative electrodes of Example 1 and Comparative Examples 1 to 4 were measured for discharge capacity retention as a function of the number of cycles according to the same method as before.

As for the discharge capacity retention evaluation, the cells were charged to 4.4V and then discharged to 2.75V at 25° C. at a C-rate of 1 C. The discharge capacity retention was calculated as a percent ratio of capacity after repetitive charges and discharges against the initial capacity. The results are shown in FIG. 4.

Figure 4:
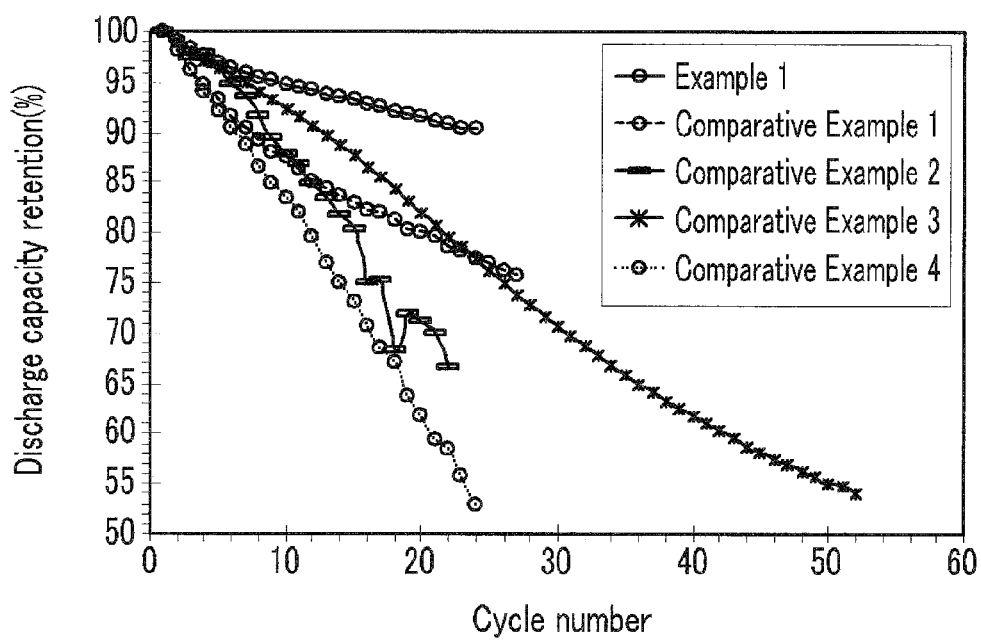
FIG. 4 is a graph showing the discharge capacity retention of the cells including the negative electrodes according to Example 1 of the present invention and Comparative Examples 1 to 4.

As shown in FIG. 4, the negative electrode including an interpenetrating network as a binder resin according to Example 1 had excellent discharge capacity retention compared with the ones of Comparative Examples 1 to 4. In particular, the negative electrode of carboxylmethyl cellulose and polyacrylic acid according to Comparative Example 3 had better discharge capacity retention than the negative electrode including only carboxylmethyl cellulose according to Comparative Example 4. However, the one with an interpenetrating networks forming from carboxylmethyl cellulose and the polyacrylic acid according to Example 1 had better discharge capacity retention than the one of Comparative Example 4.

5. Coulombic Efficiency Evaluation

Test cells including the negative electrodes of Example 1 and Comparative Example 1 were evaluated for coulombic efficiency.

The coulombic efficiency (%) was performed using the same method as the discharge capacity retention and was calculated as a percentage of discharge capacity against charge capacity. The results are shown in FIG. 5.

Figure 5:
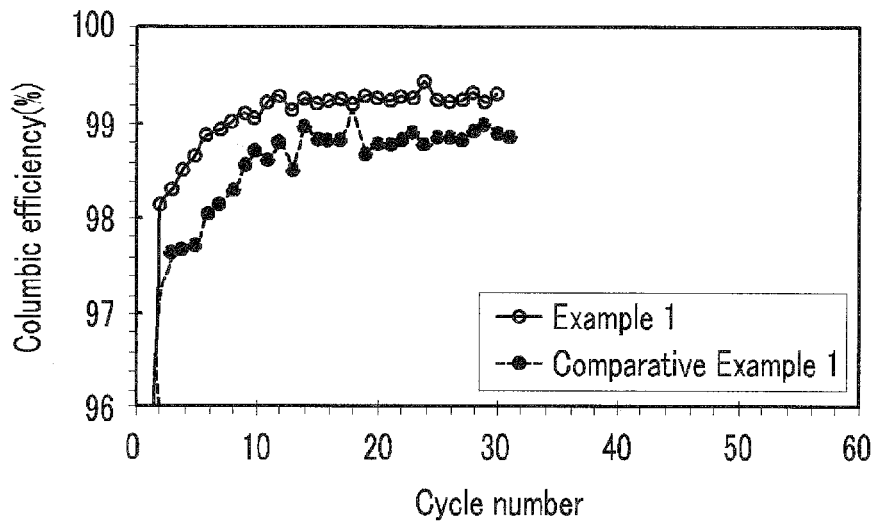
FIG. 5 is a graph showing the coulombic efficiency as a function of cycle numbers of the cells including the negative electrode according to Example 1 of the present invention and Comparative Examples 1, 2, and 4.

As shown in FIG. 5, the negative electrode of Example 1 had an interpenetrating network as a resin had a better coulombic efficiency compared to the one of Comparative Example 1. In particular, the negative electrode of Comparative Example 1 had fluctuations in the coulombic efficiency. The reason is that the volume of the negative electrode was severely changed or expanded during the charge and discharge cycles because the binder resin in the negative electrode of Comparative Example 1 is not equipped to handle the volume expansion.

6. Thickness Expansion Ratio Evaluation of Battery Cells

The test cells including the negative electrodes of Example 1 and Comparative Examples 1 and 2 were charged at a 0.1 C rate and examined for thickness expansion ratio.

The thickness expansion ratios were calculated using Equation 2.

Thickness expansion ratio (%)=[(thickness of a negative electrode after electrolyte solution injection−thickness of a negative electrode before electrolyte solution injection)/(thickness of a negative before electrode electrolyte solution injection)]× 100   Equation 2

The phrase, "after electrolyte solution injection" refers to the cell after it is charged, and the phrase "before electrolyte solution injection" refers to the cell before it is charged.

The test cells including the negative electrodes of Comparative Examples 1 and 2 respectively had thickness expansion ratios of 40% and 60%, while the test cell including the negative electrode of Example 1 had only a thickness expansion ratio of 30%.

Electrode Property Evaluation

1. Adhesion Strength Evaluation

The negative electrodes of Example 1 and Comparative Example 1 were evaluated for adhesion strength.

The adhesion strength was measured by affixing the negative electrodes of Example 1 and Comparative Example 1 on a universal materials testing machine with single column, available from INSTRON Co. Ltd., and then peeling the current collector layer at a speed of 50.0 mm/min at angle of 180°.

The measured adhesion strength between the current collector and the active material layer of Comparative Example 1 was 0.07 N/mm, while the adhesion strength of Example 1 was 0.1 N/mm.

2. Tensile Strength Evaluation

The negative electrodes of Example 1 and Comparative Examples 1 and 2 were measured for tensile strength. The results are shown in FIG. 6.

The tensile strength was measured with a universal materials testing machine with single column, available from INSTRON Co. Ltd., at a crosshead speed of 20.0 mm/min.

Figure 6:
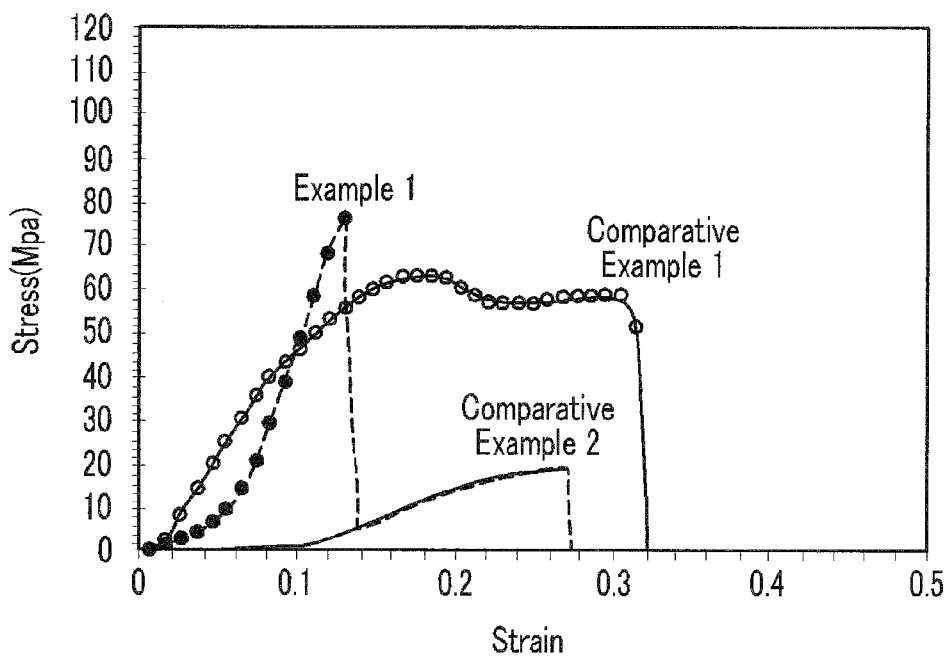
FIG. 6 is a graph showing the tensile strengths of the negative electrodes according to Example 1 of the present invention, and Comparative Examples 1 and 2.

As shown in FIG. 6, the negative electrode of Comparative Example 1 and Comparative Example 2 had tensile strengths of 65 MPa and 20 M/Pa, respectively, while the negative electrode of Example 1 had a high tensile strength of 80 MPa.

3. Solvent-Resistance Evaluation

The negative electrodes of Example 1 and Comparative Example 1 were measured for solvent-resistance. The results are shown in FIGS. 7A and 7B.

The solvent-resistance was evaluated by examining a change in adhesion strength of the negative electrode before and after dipping it in an electrolyte solution for 12 hours.

Figure 7A:
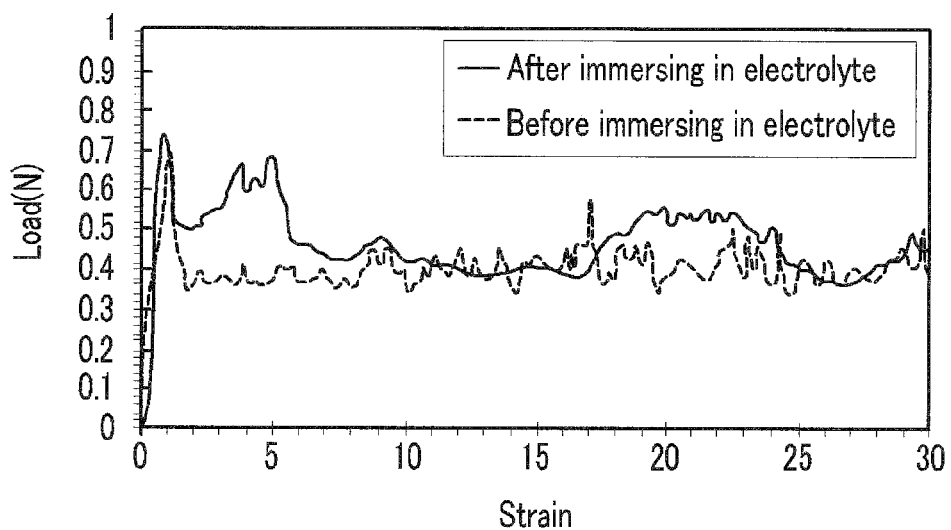
FIGS. 7A and 7B show the solvent-resistance curves of the negative electrode according to Example 1 of the present invention and, Comparative Example 1, respectively.
Figure 7B:
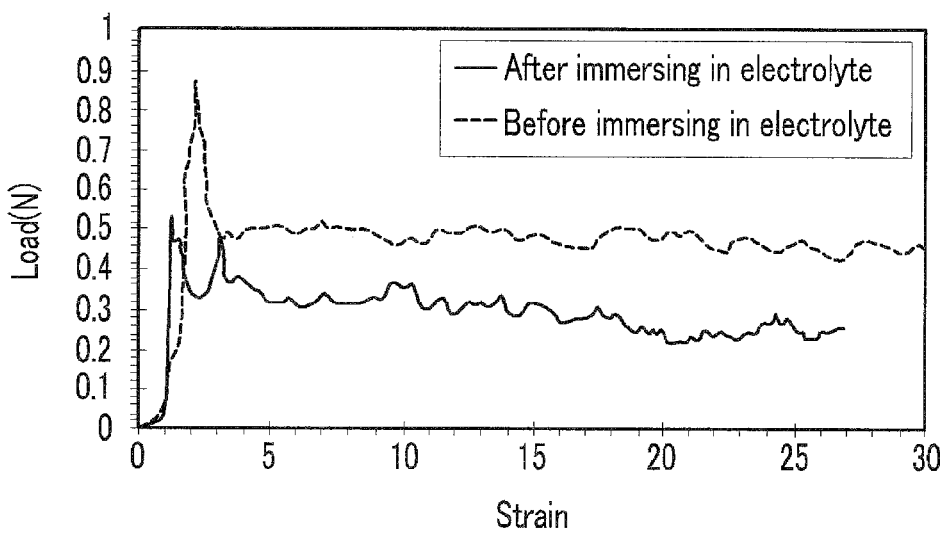
Figure 5:
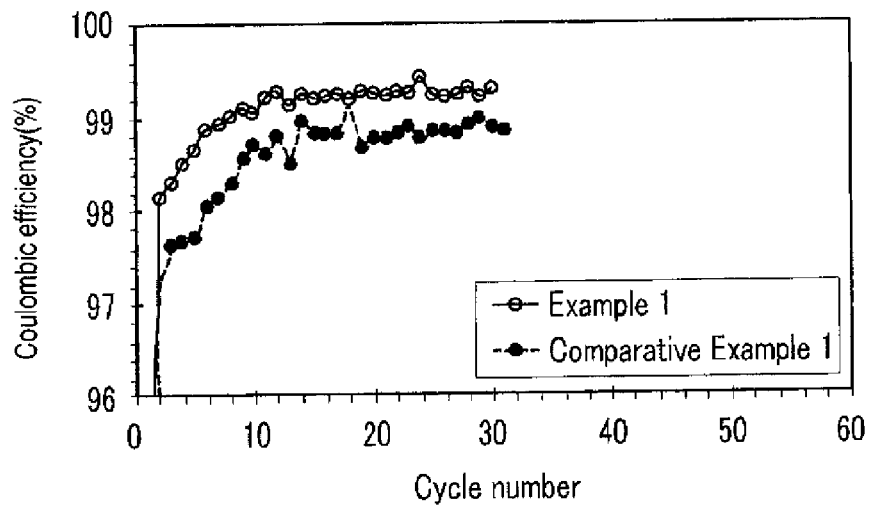
Figure 6:
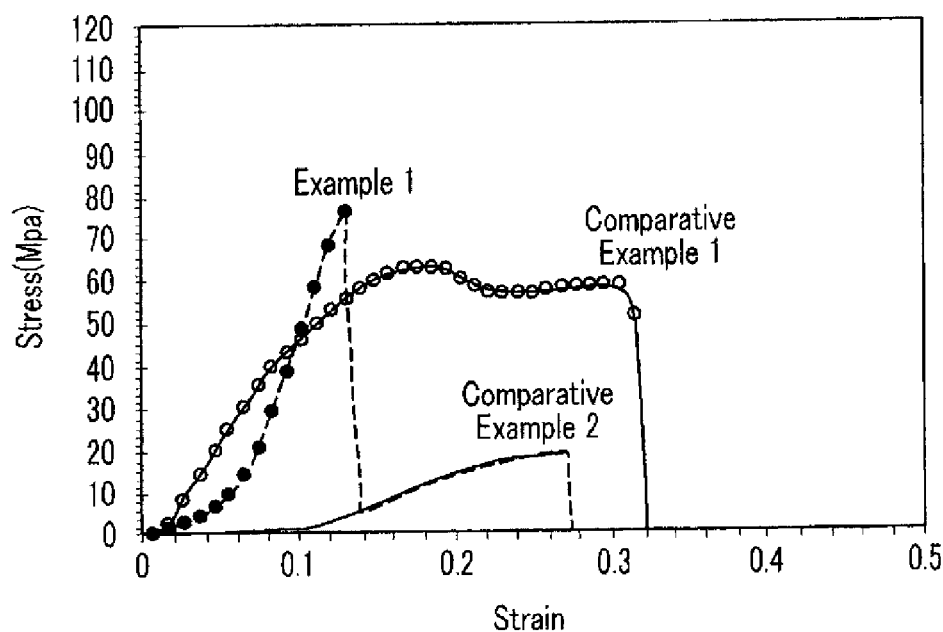

FIGS. 7A and 7B are graphs showing solvent-resistance results for the negative electrodes of Example 1 and Comparative Example 1, respectively.

As shown in FIGS. 7A and 7B, the negative electrode of Example 1 had no adhesion strength change before and after being dipped in an electrolyte solution. However, the negative electrode of Comparative Example 1 had deteriorated adhesion strength after being dipped in an electrolyte solution. Accordingly, the negative electrode of Example 1 had little material eluted in the electrolyte solution.

The negative electrodes of Example 1 and Comparative Examples 1 and 2 were dipped in N-methylpyrrolidone as a solvent for 12 hours and inspected visually.

The negative electrode of Example 1 had little change, while the negative electrode of Comparative Example 1 had swelling, which is caused by detachment of the active material on the surface thereof. Similarly, the negative electrode of Comparative Example 2 had poor results because the binder component completely eluted into N-methylpyrrolidone, thereby rendering the active material detached from the current collector.

EXAMPLE 3

Fabrication of Negative Electrode

A composition for forming an active material layer was prepared by uniformly mixing 93 wt % silicon oxide negative active material, available from Shin-Etsu Chemical Co., Ltd., and 7 wt % binder composition. The binder composition was prepared by mixing carboxylmethyl cellulose (CMC) with a Mw of 90,000 dissolved in water, polyacrylic acid (PAA) with a Mw of 100,000 dissolved in water, and polyvinylidene fluoride (PVdF), available from Solvey Company, Hylar Latex 932, in a weight ratio of 1:1:1.

The composition for forming an active material layer was screen-printed on a Cu current collector and heat-treated at 90° C. Then, it was heat-treated again at 200° C. under a vacuum pressure of $1 \times 10^{-6}$ Torr to provide a negative electrode.

EXAMPLES 4 TO 8

Fabrication of Negative Electrodes

The negative electrodes of Examples 4 to 9 were prepared according to the same method as Example 1 except for using a different binder composition formulations as shown in the following Table 2. As shown in Table 2, Examples 6 to 8 included styrene butadiene rubber (SBR).

TABLE 2

| (unit: weight ratio) | | | | | |
|---|---|---|---|---|---|
| | Example 4 | Example 5 | Example 6 | Example 7 | Example 8 |
| CMC | 4 | 4.5 | 1 | 4 | 4.5 |
| PAA | 4 | 4.5 | 1 | 4 | 4.5 |
| PVdF | 2 | 1 | — | — | — |
| SBR | — | — | 1 | 2 | 1 |

EXAMPLE 9

Fabrication of a Negative Electrode

A composition for forming an active material layer was prepared by mixing 90 wt % silicon aluminum alloy and 10 wt % binder composition. The binder composition was prepared by mixing polyvinyl alcohol (PVA) with a Mw ranging from 13,000 to 23,000 dissolved in water, polyacrylic acid with a Mw of 100,000 dissolved in water, and polyvinylidene fluoride, available from Solvey Company, Hylar Latex 932, in a weight ratio of 5:5:1.

The composition for forming an active material layer was screen-printed on a Cu current collector, and then heat-treated at 90° C. Then, it was heat-treated again at 200° C. under a vacuum pressure of $1 \times 10^{-6}$ Torr to provide a negative electrode.

EXAMPLES 10 TO 14

Fabrication of Negative Electrodes

The negative electrodes of Examples 10 to 14 were prepared according to the same method as Example 9 except for using the binder compositions as shown in the following Table 3. The negative electrodes of Example 12 to 14 include styrenebutadiene rubber (SBR).

TABLE 3

| (unit: weight ratio) | | | | | |
|---|---|---|---|---|---|
| | Example 10 | Example 11 | Example 12 | Example 13 | Example 14 |
| PVA | 4 | 4.5 | 1 | 4 | 4.5 |
| PAA | 4 | 4.5 | 1 | 4 | 4.5 |
| PVdF | 2 | 1 | — | — | — |
| SBR | — | — | 1 | 2 | 1 |

EXAMPLE 15

Fabrication of a Negative Electrode

A composition for forming an active material layer was prepared by mixing 80 wt % silicon oxide negative active material, available from Shin-Etsu Chemical Co., Ltd., and 20 wt % binder composition prepared by uniformly mixing polyethylene imine (PEI) dissolved in water, polyacrylic acid with a Mw of 100,000 dissolved in water, and polyvinylidene fluoride, available from Solvey Company, Hylar Latex 932, in a weight ratio of 1:1:1.

The composition for forming an active material layer was screen-printed on a Cu current collector and heat-treated at 90° C. Then, it was heat-treated again at 200° C. under a vacuum pressure of $1 \times 10^{-6}$ Torr to provide a negative electrode.

EXAMPLES 16 TO 20

Fabrication of Negative Electrodes

The negative electrodes of Examples 16 to 20 were prepared according to the same method as Example 15 except for using different binder composition formulations as shown in the following Table 4.

TABLE 4

| (unit: weight ratio) | | | | | |
|---|---|---|---|---|---|
| | Example 16 | Example 17 | Example 18 | Example 19 | Example 20 |
| PEI | 4 | 4.5 | 1 | 4 | 4.5 |
| PAA | 4 | 4.5 | 1 | 4 | 4.5 |
| PVdF | 2 | 1 | — | — | — |
| SBR | — | — | 1 | 2 | 1 |

COMPARATIVE EXAMPLE 5

Fabrication of a Negative Electrode

A negative electrode was prepared according to the same method as Comparative Example 1 except for using 7 wt % of carboxyl methyl cellulose with a Mw of 90,000 dissolved in water instead of polyamide imide.

EXAMPLES 21 AND 22

Fabrication of a Negative Electrode

A negative electrode was prepared according to the same method as in Example 3, except for using the binders of the following Table 5.

COMPARATIVE EXAMPLES 6 TO 9

The negative electrodes of Examples 6 to 9 were prepared according to the same method as in Example 3 except for using different binder formulations as shown in Table 5, and the compositions were not heat treated under vacuum.

TABLE 5

| (unit: weight ratio) | | | | | |
|---|---|---|---|---|---|
| | CMC | PVA | PAA | SBR | PVdF |
| Example 21 | — | 5 | 5 | — | — |
| Example 22 | 5 | — | 5 | — | — |
| Comparative Example 6 | 5 | — | — | 5 | — |
| Comparative Example 7 | — | — | 3 | 1 | — |
| Comparative Example 8 | — | — | 5 | — | 5 |
| Comparative Example 9 | — | — | 3 | — | 1 |

Fabrication of Test Cells for Characteristic Evaluation

The battery cells including the negative electrodes of Examples 3 to 22 and Comparative Examples 5 to 9 were prepared to evaluate for the electrochemical characteristics.

The negative electrodes of Examples 3, 9, 15, and 21 were used.

$LiCoO_2$ with an average particle diameter of 10 μm, polyvinylidene fluoride as a binder, and carbon (Super-P) as a conductive material were mixed in a weight ratio of 94:3:3, and the mixture was dispersed in N-methyl-2-pyrrolidone to form a positive active material composition. The composition was coated on an aluminum foil 15 μm-thick, dried, and compressed to provide a positive electrode.

The electrode with a 25 μm-thick polyethylene separator was wound and compressed, and then an electrolyte solution was injected therein to provide a 18650-cylindrical battery cell. The electrolyte was prepared by dissolving 1 mol/L of LiPF$_6$ in a mixed solvent of propylene carbonate (PC), diethyl carbonate (DEC), and ethylene carbonate (EC) at a 1:1:1 volume ratio.

Battery Cell Characteristic Evaluation

1. Charge and Discharge Capacity and Formation Efficiency

The negative electrodes of Examples 3, 9, 15, and 21 and Comparative Example 1 were used to provide test cells. Each of the test cells was evaluated for the charge and discharge capacity and formation efficiency during the formation charge and discharge cycle. The results are shown in Table 6. The results for Comparative Example 1 are also shown for comparison.

The formation charge was performed by charging the cells with 0.2 C to 4.4V and discharging them with 0.2 C to 2.75V.

TABLE 6

| Negative electrode | Charge capacity (mAh) | Discharge capacity (mAh) | Formation efficiency (%) |
|---|---|---|---|
| Comparative Example 1 | 4356.6 | 3014.8 | 69.2 |
| Example 21 | 4374.3 | 3182.5 | 72.8 |
| Example 3 | 4369.9 | 3200.2 | 73.2 |
| Example 9 | 4347.8 | 3209.0 | 73.8 |
| Example 15 | 4361.0 | 3209.0 | 73.6 |

As shown in the Table 6, the negative electrodes including the interpenetrating network according to Examples 3, 9, 15, and 21 had better initial charge and discharge capacities and formation efficiency than the one of Comparative Example 1.

The negative electrodes of Example 3, 9, 15, and 21 and Comparative Example 1 were also measured for electrode expansion ratio. They all had similar electrode expansion ratios. Therefore, the negative electrodes including a cross-linking network according to the present invention had no electrode expansion due to the flexibility and elasticity imparted by the cross-linking network and/or by the fluorine-based binder.

2. Cycle-Life Characteristic Evaluation

The negative electrodes of Examples 3-6, 9, 10, 15, and 21 and Comparative Examples 1, 5, 8, 9, 10, and 11 were evaluated for the cycle-life characteristics. The cycle-life characteristic evaluation was performed at between 4.3V and 2.75 V and at a current between 0.8 C and 1 C (one-time charge and discharge). The discharge capacity retention was used to evaluate for the cycle-life characteristics. The discharge capacity retention was calculated as a percent ratio of capacity after 100$^{th}$ cycle charge and discharge against the initial capacity. The results are shown in Table 7.

TABLE 7

| | 100$^{th}$ capacity retention (%) |
|---|---|
| Example 3 | 71 |
| Example 4 | 75 |
| Example 5 | 75 |
| Example 6 | 70 |
| Example 9 | 80 |
| Example 10 | 80 |
| Example 15 | 72 |
| Comparative Example 1 | 60 |

TABLE 7-continued

| | 100$^{th}$ capacity retention (%) |
|---|---|
| Comparative Example 5 | 23 |
| Example 21 | 60 |
| Comparative Example 8 | 5 |
| Comparative Example 9 | 15 |
| Comparative Example 10 | 17 |
| Comparative Example 11 | 10 |

Referring to the Table 7, the battery cells including a negative electrode of the present invention had an improved cycle-life characteristic.

Electrode Property Evaluation

1. Adhesion Strength Evaluation

The negative electrodes of Examples 3-9, 21, and 22 and Comparative Example 1, 5, 6, 7, and 8 were evaluated for adhesion strength.

The adhesion strength was measured by affixing the negative electrodes of examples and comparative examples to a universal material testing machine with a single column, available from INSTRON Co. Ltd., and then peeling the current collector layers at a 90° angle and at a speed of 50.0 mm/min. Both the adhesion strengths before and after the vacuum heat treatment were measured. The results are shown in Table 8.

TABLE 8

| | Adhesion strength (N/mm) | | Initial efficiency (%) |
|---|---|---|---|
| | before heat treatment | after heat treatment | after heat treatment |
| Example 3 | 0.038 | 0.068 | 72.7 |
| Example 4 | 0.037 | 0.061 | 73.6 |
| Example 5 | 0.042 | 0.052 | 73.4 |
| Example 6 | 0.024 | 0.083 | 73.1 |
| Example 7 | 0.029 | 0.069 | 73.5 |
| Example 8 | 0.031 | 0.058 | 73.3 |
| Example 9 | 0.058 | 0.078 | 73.3 |
| Comparative Example 1 | N/A | 0.081 | 69.3 |
| Comparative Example 5 | 0.004 | 0.007 | 73.6 |
| Example 21 | 0.010 | 0.066 | 73.4 |
| Example 22 | 0.047 | 0.033 | 73.4 |
| Comparative Example 5 | 0.081 | 0.124 | N/A |
| Comparative Example 6 | 0.008 | 0.007 | 72.8 |
| Comparative Example 7 | 0.026 | 0.008 | 70.5 |
| Comparative Example 8 | 0.074 | 0.011 | 72.8 |

The negative electrodes of Examples 3-9 and 21 had relatively better adhesion strength than the ones of Comparative Examples 7 and 9. The negative electrode of Example 22 had a decrease in adhesion strength after heat treatment but it had a high initial efficiency. The negative electrode of Comparative Example 1 had high adhesion strength but a low initial efficiency. The negative electrode of Comparative Example 5 had high adhesion strength but with such a low initial efficiency that it could not be measured.

2. Electrode Flexibility Evaluation

In order to evaluate if whether the electrode flexibility depends on the addition of a third polymer (i.e., fluorine-based or a rubber-based polymer), the negative electrodes of Examples 3, 9, 15, 21, and 22 were evaluated for electrode flexibility. The negative electrodes of various examples were wound into a prismatic type battery and were inspected visually for signs of breakage. The results are shown in Tables 9 and 10. The inspection for breakage was rated as high, middle, or low based on the result of Example 3.

TABLE 9

| Example 21 | Example 22 | Example 3 | Example 9 | Example 15 |
|---|---|---|---|---|
| middle | middle | high | high | high |

As shown in the Table 9, the negative electrodes of Examples 3, 9, 15, 21, and 22 had adequate flexibility that can be used for high capacity rechargeable batteries. In particular, the negative electrodes that include a fluorine-based or a rubber-based polymer (Examples 3, 9, and 15) had excellent flexibility and can be used for rechargeable battery cells with high capacity.

While the present invention has been particularly described with reference to certain exemplary embodiments, it is to be understood by those of ordinary skill in the art that various changes in forms and compositions may be made without departing from the spirit and scope of the present invention.

What is claimed is:

1. A negative electrode for a rechargeable lithium battery, comprising:
  a current collector; and
  a negative active material layer on the current collector that is formed by
    coating the current collector with a mixture comprising a negative active material, a first polymer and a second polymer,
    cross-linking the first polymer having a hydroxyl or amine group and the second polymer having a carboxylic acid group;
    drying the coated current collector at a first temperature; and
    heat treating the dried current collector at a second temperature higher than the first temperature wherein the second temperature is at least about 130° C., thereby forming a cross-linked interpenetrating network from the first and second polymers with a solvent-resistance of 5% or less when measured in an electrolyte solution.

2. The negative electrode of claim 1, wherein the interpenetrating network is further formed by cross-linking with a third polymer of a rubber-based or fluorine-based polymer.

3. The negative electrode of claim 2, wherein a mole ratio of the first and second polymers to the third polymer is between 95:5 and 60:40.

4. The negative electrode of claim 2, wherein the third polymer of the rubber-based binder is selected from the group consisting of styrene butadiene rubbers (SBR), nitrile butadiene rubbers (NBR), methyl methacrylate butadiene rubbers, chloroprene rubbers, carboxyl modified styrene butadiene rubbers, modified polyorganosiloxane-based polymers and combinations thereof.

5. The negative electrode of claim 2, wherein the third polymer of the fluorine-based polymer is selected from the group consisting of polyvinylidene fluoride (PVdF), copolymers of vinylidene chloride and hexafluoropropylene, and combinations thereof.

6. The negative electrode of claim 1, wherein the interpenetrating network is not electrochemically reactive.

7. The negative electrode of claim 1, wherein the interpenetrating network has a tensile strength of 40 MPa or more.

8. The negative electrode of claim 1, wherein the interpenetrating network comprises the first and second polymers at a mole ratio between 95:5 and 20:8.

9. The negative electrode of claim 1, wherein the first polymer comprises at least one repeating unit represented by the following Formulas 1 to 3:

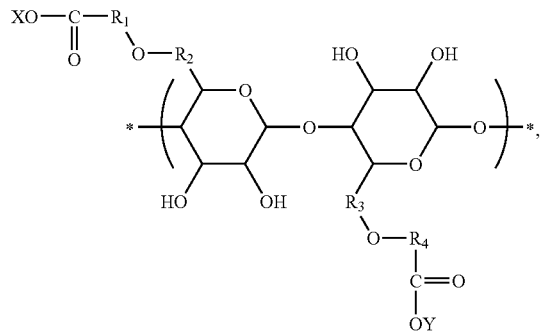

Formula 1 wherein,
  each of $R_1$ and $R_4$ is independently a C1 to C4 alkylene, or an alkylene oxide,
  each of $R_2$ and $R_3$ is independently $-(CRR')_n-$, where each of R and R' is independently hydrogen or a C1 to C5 alkyl, n is an integer ranging from 1 to 4 and X and Y are independently selected from alkali metals;

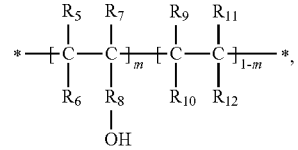

Formula 2 wherein,
  each of $R_5$ to $R_7$ and $R_{10}$ is independently hydrogen or a C1 to C5 alkyl,
  $R_8$ is $-(CRR')_n-$, where each of R and R' is independently hydrogen or a C1 to C5 alkyl, and n is an integer from 0 to 4,
  each of $R_9$ and $R_{11}$ is independently selected from the group consisting of hydrogen, C1 to C5 alkyls, and $-(CRR')_nOR''$, where each of R, R', and R'' is independently hydrogen or a C1 to C5 alkyl, and n is an integer from 1 to 4,
  $R_{12}$ is $-OCOZ$, where, Z is an alkali metal, and
  m ranges from 0.1 to 1; and

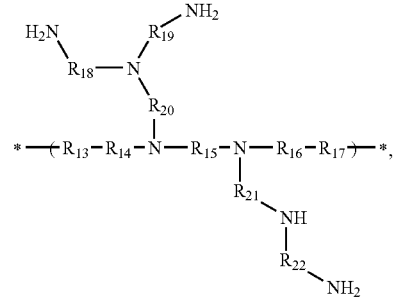

Formula 3 wherein, each of $R_{13}$, $R_{15}$, and $R_{17}$ to $R_{22}$ is independently $-(CRR')_n-$, where each of R and R' is independently hydrogen or a C1 to C5 alkyl, and n is an integer from 1 to 4, and each of $R_{14}$ and $R_{16}$ is independently —[(CRR')$_p$—(NH)]$_q$—, where each of R and R' is independently hydrogen or a C1 to C5 alkyl, p is an integer from 1 to 4, and q is an integer from 1 or 2.

10. The negative electrode of claim 1, wherein the first polymer is selected from the group consisting of carboxylmethyl cellulose, polyvinyl alcohol, copolymers of vinyl alcohol and vinyl acetate, copolymers of vinyl alcohol and styrene, copolymers of vinyl alcohol and methyl methacrylate, copolymers of vinyl alcohol and methylacrylate, copolymers of vinyl alcohol and ethyl methacrylate, copolymers of vinyl alcohol and ethylacrylate, copolymers of vinyl alcohol and butylacrylate, copolymers of vinyl alcohol and butyl methacrylate, polyethyleneimine, and mixtures thereof.

11. The negative electrode of claim 1, wherein the first polymer has a weight average molecular weight (Mw) between 1000 and 1,000,000.

12. The negative electrode of claim 1, wherein the second polymer comprises a polymer including a repeating unit of the following Formula 4:

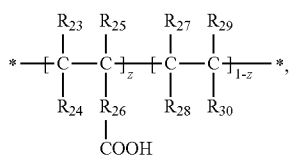

Formula 4 wherein,
each of $R_{23}$ to $R_{25}$, and $R_{28}$ is independently hydrogen or a C1 to C5 alkyl,
$R_{26}$ is —(CRR')$_n$—, where each of R and R' is independently hydrogen or a C1 to 5 alkyl, and n is an integer from 0 to 4,
each of $R_{27}$ and $R_{29}$ is independently selected from the group consisting of hydrogen, C1 to C5 alkyls, and —(CRR')$_n$OR", where, each of R, R', and R" is independently hydrogen, or a C1 to C5 alkyl, and n is an integer from 1 to 4,
$R_{30}$ is —OCOZ, where, Z is an alkali metal, and $0 < z \leq 1$.

13. The negative electrode of claim 1, wherein the second polymer is selected from the group consisting of poly(meth)acrylic acid, copolymers of (meth)acrylic acid and (meth)ethylacrylic acid, copolymers of (meth)acrylic acid and (meth)butylacrylic acid, and mixtures thereof.

14. The negative electrode of claim 1, wherein the second polymer has a weight average molecular weight between 1,000 and 1,000,000.

15. The negative electrode of claim 1, wherein the first and second polymers are water-soluble polymers.

16. The negative electrode of claim 1, wherein the negative active material is selected from the group consisting of lithium metals, metal materials that can alloy with lithium, transition elements oxides, materials that are reversibly capable of doping and dedoping with lithium, materials that are reversibly capable of forming a lithium-containing compound, and materials that are reversibly capable of intercalating and deintercalating lithium ions.

17. The negative electrode of claim 16, wherein the negative active material is selected from the group consisting of Si, SiO$_x$ (where 0<x<2), Sn, SnO$_2$ and mixtures thereof.

18. The negative electrode of claim 1, wherein the negative active material is present at an amount between 80 and 95 wt% based on the total weight of the active material layer.

19. The negative electrode of claim 1, wherein the negative active material layer has adhesion strength between 0.05 N/mm and 0.2 N/mm with respect to a current collector.

20. The negative electrode of claim 1, wherein the negative electrode has an expansion ratio of 30% or less after the negative electrode is immersed in an electrolyte solution.

21. The negative electrode of claim 1, wherein the first temperature is between about 80 and about 120° C., and the second temperature is between about 130 and about 200° C.

22. A rechargeable lithium battery comprising:
a negative electrode comprising:
a current collector; and
a negative active material layer on the current collector formed by
coating the current collector with a mixture comprising a negative active material, a first polymer and a second polymer,
cross-linking the first polymer having a hydroxyl or amine group and the second polymer having a carboxylic acid group;
drying the coated current collector at a first temperature; and
heat treating the dried current collector at a second temperature higher than the first temperature wherein the second temperature is at least about 130° C., thereby forming a cross-linked interpenetrating network from the first and second polymers with a solvent-resistance of 5% or less when measured in a water or a non-aqueous electrolyte solution;
a positive electrode; and
an electrolyte.

23. The rechargeable lithium battery of claim 22, wherein the interpenetrating network is further formed by cross-linking with a third polymer of a rubber-based or fluorine-based polymer.

24. The rechargeable lithium battery of claim 23, wherein the third polymer of the rubber-based binder is selected from the group consisting of styrene butadiene rubbers (SBR), nitrile butadiene rubbers (NBR), methyl methacrylate butadiene rubbers, a chloroprene rubbers, carboxyl modified styrene butadiene rubbers, and modified polyorganosiloxane-based polymers, and combinations thereof.

25. The rechargeable lithium battery of claim 23, wherein the third polymer of the fluorine-based polymer is selected from the group consisting of polyvinylidene fluoride (PVdF), copolymers of vinylidene chloride and hexafluoropropylene, and combinations thereof.

26. The rechargeable lithium battery of claim 22, wherein the interpenetrating network is not electrochemically reactive.

27. The rechargeable lithium battery of claim 22, wherein the interpenetrating network has tensile strength of 40 MPa or more.

28. The rechargeable lithium battery of claim 22, wherein the interpenetrating network comprises the first and second polymers at a mole ratio between 95:5 and 20:8.

29. The rechargeable lithium battery of claim 28, wherein a mole ratio of the third polymer to the first and second polymers is between 95:5 and 60:40.

30. The rechargeable lithium battery of claim 22, wherein the first polymer comprises at least one repeating unit selected from the group consisting of Formulas 1 to 3, and combinations thereof:

Formula 1

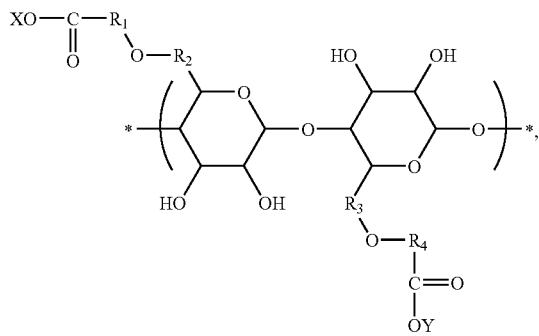

wherein,
each of $R_1$ and $R_4$ is independently a C1 to C4 alkylene, or an alkylene oxide,
each of $R_2$ and $R_3$ is independently —$(CRR')_n$—, where each of R and R' is independently hydrogen or a C1 to C5 alkyl, n is an integer from 1 to 4, and
X and Y are independently selected from alkali metals;

Formula 2

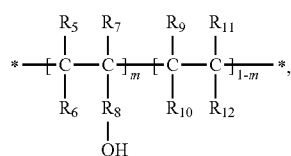

wherein,
each of $R_5$ to $R_7$ and $R_{10}$ is independently hydrogen or a C1 to C5 alkyl,
$R_8$ is —$(CRR')_n$—, where, each of R and R' is independently hydrogen or a C1 to C5 alkyl, and n is an integer from 0 to 4,
each of $R_9$ and $R_{11}$ is independently selected from the group consisting of hydrogen, C1 to C5 alkyls, and —$(CRR')_n OR''$, where, each of R, R', and R'' is independently hydrogen, or a C1 to C5alkyl, and n is an integer from 1 to 4,
$R_{12}$ is —OCOZ where Z is an alkali metal, and
m ranges from 0.1 to 1; and Formula 3

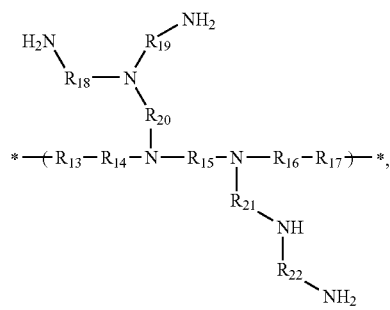

wherein, each of $R_{13}$, $R_{15}$, and $R_{17}$ to $R_{22}$ is independently —$(CRR')_n$—, where, each of R and R' is independently hydrogen or a C1 to C5 alkyl, and n is an integer from 1 to 4, each of $R_{14}$ and $R_{16}$ is independently —[$(CRR')_p$—$(NH)_q$—, where each of R and R' is independently hydrogen or a C1 to C5 alkyl, p is an integer from 1 to 4, and q is an integer from 1 or 2.

31. The rechargeable lithium battery of claim 22, wherein the first polymer is selected from the group consisting of carboxylmethyl cellulose, polyvinyl alcohol, copolymers of vinyl alcohol and vinyl acetate, copolymers of vinyl alcohol and styrene, copolymers of vinyl alcohol and methyl methacrylate, copolymers of vinyl alcohol and methylacrylate, copolymers of vinyl alcohol and ethyl methacrylate, copolymers of vinyl alcohol and ethylacrylate, copolymers of vinyl alcohol and butylacrylate, copolymers of vinyl alcohol and butyl methacrylate, polyethyleneimine, and mixtures thereof.

32. The rechargeable lithium battery of claim 22, wherein the first polymer has a weight average molecular weight (Mw) between 1000 and 1,000,000.

33. The rechargeable lithium battery of claim 22, wherein the second polymer comprises a polymer including a repeating unit of Formula 4:

Formula 4

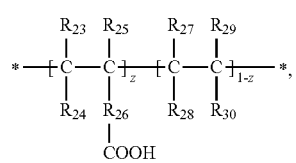

wherein,
each of $R_{23}$ to $R_{25}$, and $R_{28}$ is independently hydrogen, or a C1 to C5 alkyl,
$R_{26}$—$(CRR')_n$—, where each of R and R' is independently hydrogen or a C1 to 5 alkyl, and n is an integer from 0 to 4,
each of $R_{27}$ and $R_{29}$ is independently selected from the group consisting of hydrogen, C1 to C5 alkyls, and —$(CRR')_n OR''$ where each of R, R', and R'' is independently hydrogen or a C1 to C5alkyl, and n is an integer from 1 to 4,
$R_{30}$ is —OCOZ, where Z is an alkali metal, and $0 < z \leq 1$.

34. The rechargeable lithium battery of claim 22, wherein the second polymer is selected from the group consisting of poly(meth)acrylic acid, copolymers of (meth)acrylic acid and (meth)ethylacrylic acid, copolymers of (meth)acrylic acid and (meth)butylacrylic acid, and mixtures thereof.

35. The rechargeable lithium battery of claim 22, wherein the second polymer has a weight average molecular weight between 1,000 and 1,000,000.

36. The rechargeable lithium battery of claim 22, wherein the first and second polymers are water-soluble polymers.

37. The rechargeable lithium battery of claim 22, wherein the negative active material is selected from the group consisting of lithium metals, metal materials that can alloy with lithium, transition element oxides, materials that are reversibly capable of doping and dedoping with lithium, materials that are reversibly capable of forming a lithium—containing compound, and materials that are reversibly capable of intercalating and deintercalating lithium ions.

38. The rechargeable lithium battery of claim 37, wherein the negative active material is selected from the group consisting of Si, $SiO_x$ (where $0 < x < 2$), Sn, $SnO_2$ and mixtures thereof.

39. The rechargeable lithium battery of claim 22, wherein the negative active material is present at an amount between 80 and 95 wt% based on the total weight of the active material layer.

40. The rechargeable lithium battery of claim 22, wherein the negative active material layer has adhesion strength between 0.05 N/mm and 0.2 N/mm with respect to a current collector.

41. The rechargeable lithium battery of claim 22, wherein the negative electrode has an expansion ratio of 30% or less when immersed in an electrolyte solution.

42. The rechargeable lithium battery of claim 22, wherein the first temperature is between about 80 and about 120° C., and the second temperature is between about 130 and about 200° C.

* * * * *

UNITED STATES PATENT AND TRADEMARK OFFICE
CERTIFICATE OF CORRECTION

| | |
|---|---|
| PATENT NO. | : 7,931,984 B2 |
| APPLICATION NO. | : 12/272700 |
| DATED | : April 26, 2011 |
| INVENTOR(S) | : Nam-Soon Choi et al. |

It is certified that error appears in the above-identified patent and that said Letters Patent is hereby corrected as shown below:

On the Title Page

| | |
|---|---|
| Item (57) Abstract, line 6 | Delete "interpenetrating network network," Insert -- interpenetrating network, -- |
| Item (57) Abstract, lines 7-8 | Delete "interpenetrating network network." Insert -- interpenetrating network. -- |

In the Drawings

| | |
|---|---|
| FIG. 5, Sheet 4 of 5 | Delete Drawing Sheet 4 and substitute therefore the Drawing Sheet, consisting of FIG. 5, as shown on the attached page. |
| | Delete "Columbic" Insert -- Coulombic -- |

In the Claims

| | |
|---|---|
| Column 24, Claim 9, line 46 | Delete "C5alkyls" Insert -- C5 alkyls -- |
| Column 24, Claim 9, line 48 | Delete "C5alkyl" Insert -- C5 alkyl -- |
| Column 25, Claim 12, line 37 | Delete "5" Insert -- C5 -- |
| Column 26, Claim 24, line 44 | Before "chloroprene" Delete "a" |
| Column 27, Claim 30, line 42 | Delete "C5alkyls" Insert -- C5 alkyls -- |

Signed and Sealed this
Seventh Day of August, 2012

David J. Kappos
*Director of the United States Patent and Trademark Office*